United States Patent [19]

Norrie et al.

[11] Patent Number: 5,386,549
[45] Date of Patent: Jan. 31, 1995

[54] ERROR RECOVERY SYSTEM FOR RECOVERING ERRORS THAT OCCUR IN CONTROL STORE IN A COMPUTER SYSTEM EMPLOYING PIPELINE ARCHITECTURE

[75] Inventors: Christopher I. W. Norrie, San Jose; Carolee V. Newcomb, Los Altos; Peter K. Yu; Allan Zmyslowski, both of Sunnyvale, all of Calif.

[73] Assignee: Amdahl Corporation, Sunnyvale, Calif.

[21] Appl. No.: 978,829

[22] Filed: Nov. 19, 1992

[51] Int. Cl.⁶ .......................................... H03M 13/00
[52] U.S. Cl. .................................. 395/575; 371/40.1; 371/40.2; 371/21.1
[58] Field of Search ................. 371/12, 13, 51.1, 10.1, 371/10.2, 13, 21.1, 40.1, 40.2; 395/575

[56] References Cited

U.S. PATENT DOCUMENTS

| | | |
|---|---|---|
| 3,736,566 | 5/1973 | Anderson et al. |
| 3,839,705 | 10/1974 | Davis et al. |
| 3,958,227 | 5/1976 | Evans |
| 4,701,915 | 10/1987 | Kitamura ............................. 371/13 |
| 4,914,576 | 4/1990 | Zelley et al. ........................ 364/200 |
| 4,920,477 | 4/1990 | Colwell et al. ..................... 364/200 |
| 4,942,579 | 7/1990 | Goodlander et al. ............. 371/51.1 |
| 5,193,181 | 3/1993 | Barlow et al. ...................... 395/575 |
| 5,222,219 | 6/1993 | Stumpf et al. ...................... 395/325 |
| 5,291,589 | 3/1994 | Matsuura et al. .................. 395/575 |
| 5,293,613 | 3/1994 | Hayden et al. ..................... 395/575 |

FOREIGN PATENT DOCUMENTS

| | | | |
|---|---|---|---|
| 212959 | 12/1984 | Japan | G06F 9/46 |
| 117336 | 6/1985 | Japan | G06F 9/36 |
| 61-51241 | 3/1986 | Japan | G06F 12/16 |
| 117625 | 6/1986 | Japan | G06F 9/28 |
| 139836 | 6/1986 | Japan | G06F 9/38 |

OTHER PUBLICATIONS

Smith et al. "Implementing Precise Interrupts in Pipelined Processors" IEEE 1988 pp. 562–573.
Montoye et al. "Microprocesors" IEEE 1990 pp. 46–47, 262.

*Primary Examiner*—Robert W. Beausoliel, Jr.
*Assistant Examiner*—Albert Decady
*Attorney, Agent, or Firm*—Fliesler, Dubb, Meyer & Lovejoy

[57] ABSTRACT

An error recovery system used in a pipeline architecture type computer system for recovering from an error in a control word for an instruction without interrupting the sequence of processing control words by the computer system. The computer system processes instructions in a sequence of overlapping FLOWs where each FLOW is comprised of a sequence of cycles. An instruction control word is processed in each cycle of each FLOW. The error recovery system comprises a first storage for storing, for a given cycle of a FLOW, all the control words for all the instructions, a second storage for storing a control word read from the first storage and an error recovery logic for detecting an error in the control word read from the first storage and stored in the second storage and for correcting the error in the control word in the first and second storage.

3 Claims, 2 Drawing Sheets

ERROR RECOVERY SYSTEM FOR RECOVERING ERRORS THAT OCCUR IN CONTROL STORE IN A COMPUTER SYSTEM EMPLOYING PIPELINE ARCHITECTURE

BACKGROUND OF THE INVENTION

1. Field of the Invention

This invention relates to an error recovery system using parity to detect errors and to recover from such errors.

2. Description of the Related Art

Many computer systems, invoking the use of the instruction set as set forth in International Business Machine Corporation's ESA/390 Principles of Operation, employ the concept of pipeline processing of instructions. In order to carry out a computer instruction a series of control words are processed by the computing system for each of the instructions within the instruction set. In a computer system using the pipeline concept of instruction processing, the instructions are broken down into a series of FLOWs where each FLOW contains a series of cycles and each cycle processes one control word. In some computing systems each FLOW is broken down into six cycles, a decode operations code cycle D, an address presentation cycle A, a translation cycle T, a buffer access cycle B, an execution cycle X and, finally, a write or store cycle W. In order to process the instructions faster, the FLOWs overlap such that different cycles in different FLOWs are being processed at the same time rather than sequentially where each FLOW would be completed before the start of the next FLOW.

Each instruction has associated with it the number of FLOWs necessary for the instruction to be completed. A D store is provided to store each control word for each D cycle in each FLOW of each instruction within the instruction set. In some systems the first D cycle of the first flow for each instruction is implemented in logic because of time constraints and therefore the first D cycle control word is not stored in the D store. An A store is provided to store a control word to control the processing of the A, T, B, X and W cycles in each FLOW of each instruction.

The occurrence of a parity error in the control word being read out of the D or A store must be immediately addressed. One approach used to recover from the parity error is for the system to cancel the instruction being processed, repair the erroneous control word in store and then perform a command retry of the instruction. Generally this recovery procedure is successful approximately 80% of the time, leaving 20% of the time where the instruction has not been successfully processed upon retry. Such a condition gives rise to a machine check which, according to where the failure occurred, could cause the computer to halt operations. Where the 20% failure rate is not acceptable, error correction codes have been used for detecting and correcting the error. This approach is costly in regard to the resources used in storing the error correction data, the time necessary for implementing the error detection and for correction when an error is so detected.

One characteristic of the A and D stores is that the control words stored therein are infrequently modified. Wide use has been made of the concept of back-up store of a main store such that when an error occurs in the main store, the back-up store may be used in place of the main store or to refresh the data in the main store. These systems have generally been used to maintain the integrity of data that is being manipulated by the computing system. In these systems, whenever data is modified, the modified data is stored in both the main and back-up stores to maintain an accurate copy of the data in the back-up store. Much attention has been given to methods for maintaining an accurate back-up copy of the data within a computer system.

SUMMARY OF THE INVENTION

It is an object of the invention to provide an error recovering system which allows recovery from an erroneous control word that has been read from store.

It is another object of the invention to provide an error recovery system which allows recovery from an error while maintaining the sequence of FLOWs for the instruction being implemented.

It is another object of the invention to provide an error recovery system which provides economic usage of time and resources within the computing system.

Briefly, the invention requires the use of a D back-up store for the D store and an A back-up store for the A store. The contents of the A store and the A back-up store are identical at any given time. The contents of the D store and the D cycle back-up store are identical at any given time. A control word read from the D store is read into D control latches and a control word read from the A store is read into A control latches. When a parity error in a control word read from the D store is encountered, the error recovery system will set a D error latch and will cause a D interlock which will stop further processing of that D cycle. When the D error latch is set, the system will effectively stop the clocks in the system thereby halting all further processing. During the time that the system is stopping the clock to the system, in most cases, all previous FLOWs in progress before the FLOW encountering the error will be completed. The system will then cause the contents of the D back-up store to refresh all the control words in the D store. D address history latches will have stored the address of the control word in the D store that gave rise to the parity error. The system will access that same address in the D back-up store and use that control word to correct all D control latches that were originally set by the control word that gave rise to the parity error. Once the D control latches have been set to their proper values, the D interlock signal is removed and the clocks are re-initiated to the system. The system then proceeds with the processing of the instruction as if no error had been encountered.

When a parity error is detected in a control word being read from the A store, the error recovery system will set the A error latch, will generate an A interlock signal in the FLOW giving rise to the parity error and will generate a D interlock signal in the D cycle of the next FLOW following the FLOW giving rise to the parity error. When the A error latch is set, the system will effectively stop the system's clocks thereby halting further processing by the computer system. Again due to the time necessary to stop the clocks, in most cases, all the previous FLOWs in progress before the FLOW encountering the error will be completed. The computer system will then copy all of the control words in the A back-up store to the A store thereby correcting any erroneous control word that may have existed in A store. The A store address giving rise to the error is saved in the A address history latches. The computer system then reads from the A back-up store the control word whose address is stored in the A address history latches and then stores the control word into the A control latches to set the A control latches to the value that the A control latches should have been set to if the parity error had not been detected. Once the A control latches have been set to their proper values, the A and D interlock signals are removed after which the clocks are reinstated and the system proceeds as if no error had been encountered.

An advantage of the invention is that the complete contents of the back-up store is read into the failing store to refresh the failing store, thereby correcting not only the control word detected as being in error but also all other erroneous control words stored in the failing store.

Another advantage of the invention is that error recovery process is performed within the FLOW giving rise to the error, thereby not interrupting the sequence of FLOWs for the instruction being processed resulting in improved instruction recovery characteristics of the computer system.

BRIEF DESCRIPTION OF THE DRAWINGS

The invention will be described with respect to the particular embodiments thereof and reference will be made to the drawings, in which.

DETAILED DESCRIPTION OF THE PREFERRED EMBODIMENTS

Figure 1:
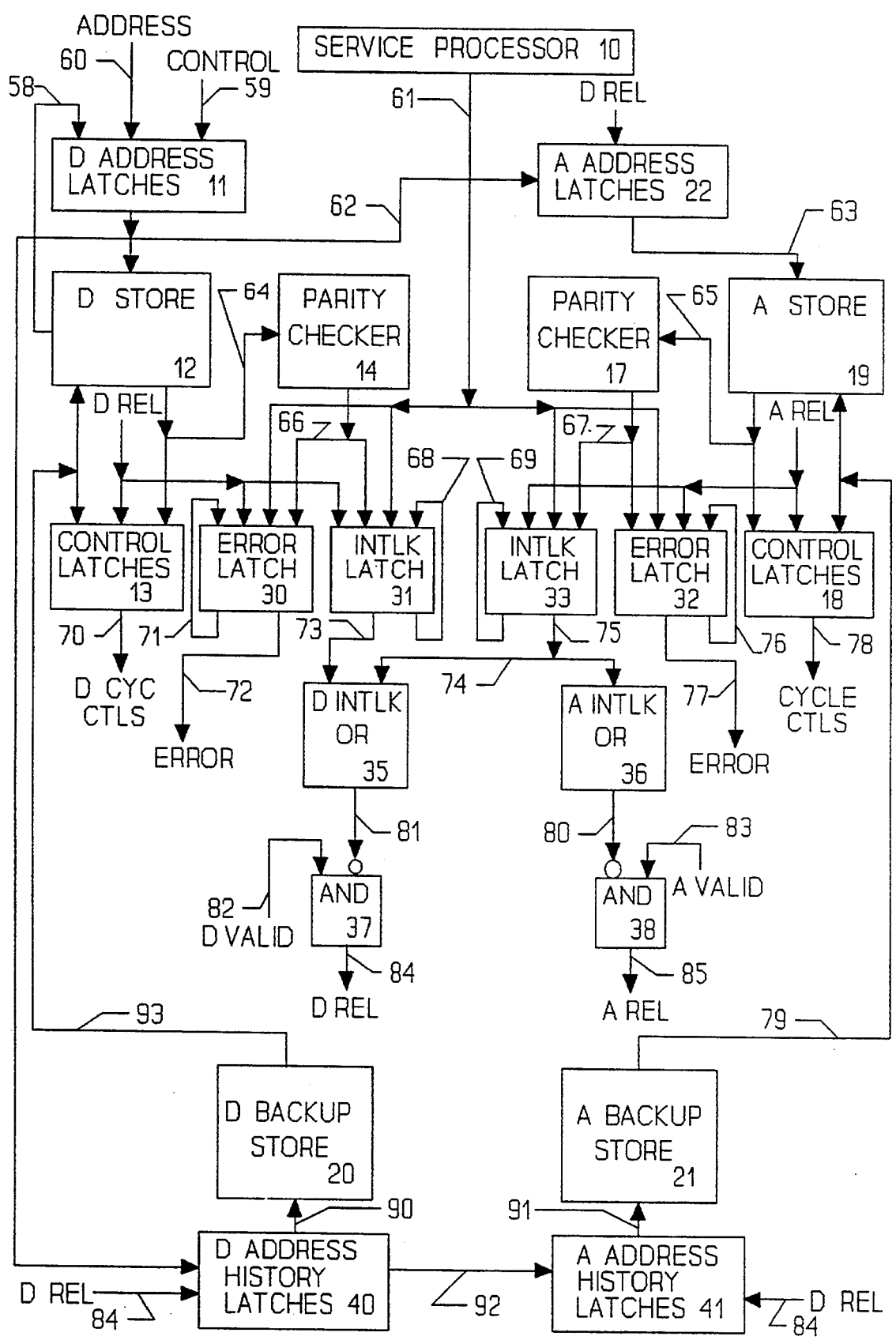
FIG. 1 is a logic diagram of the error recovery system of the/present invention.

FIG. 1 is a diagram showing the major component of the error recovery system used within the computer system.

D store 12 stores the control word for each D cycle, except the D cycle for the first FLOW, of each FLOW associated with each instruction. The D store address for the first D cycle in the first FLOW of an instruction, even though not used to fetch a control word from the D store, is provided on line 60 by the computer system to the D address latches 11. Thereafter, D store 12 generates the next D store address on line 58 to the D address latches 11 for the next D cycle in the next FLOW for a given instruction until all the FLOWs for that instruction have been completed. The address appearing on lines 58 and 60 will be read into the D address latches 11 by means of control signals appearing on line 59. The address stored in D address latches 11 is provided on line 62 to A address latches 22, to D store 12 and to D address history latches 40. The output of the D store 12 is provided on line 64 to parity checker 14 for error detection and to control latches 13 for storing the control word read from D store. The output of control latches 13 on line 70 are control signals for controlling the processing of the instruction.

Parity checker 14 detects if a parity error has occurred when a control word is read from the D store 12. If a parity error occurs, parity checker 14 will provide an error signal on line 66 which will set error latch 30 and interlock latch 31. Once error latch 30 and interlock latch 31 have been set by a parity error signal, error latch 30 will be held in the set condition by line 71 and interlock latch 31 will be held in the set condition by line 68. The output of error latch 30 is provided on line 72 to the clock logic to cause the clocks to be turned off and to the service processor 10 for providing the necessary error recovery routine to recover from the sensed error. During the time used to turn off the clocks, in most cases, all previous FLOWs in progress will be completed. Interlock latch 31 provides an error signal on line 73 to D interlock OR 35. It should be noted that D interlock OR 35 has many other inputs from the computer system which are not herein shown. The output of D interlock OR 35 is the D interlock signal on line 81 which will decondition AND 37 preventing a D release signal (D REL) appearing on line 84 thereby interrupting the system clock to the D logic so as to halt processing of the D cycle.

D back-up store 20 contains a duplicate copy of the control words stored in the D store 12 at the same address location as those control words are stored in the D store 12. When a D release signal is generated on line 84 the address in the D address history latches 40 will be read into the A address history latches 41 as the address from the D address latches 11 is read into the D address history latches 40, the address in the D address latches 11 is read into the A address latches 22, the control word read from D store at the address in D address latches 11 will be read into the control latches 13 and the output of parity checker 14 will be read into error latch 30 and interlock latch 31. If a parity error is detected by parity checker 14, the system will transfer the contents of the D back-up store 20 via line 93 into D store 12. Further, after the data in D store 12 has been corrected the address contained in the D address history latches 40 will cause the control word at that address to be read into the control latches 13, thereby setting the control latches 13 to their correct values.

When a D release signal is presented on line 84, the address present on line 62 will be read into the A addresses latches 22. The single control word for the A, T, B, X and W cycles in a given FLOW for a given instruction is stored at the same address in the A store 19 as a corresponding D cycle control word is or would have been stored in D store 12. The address from the A address latches 22 is provided by line 63 to the A store 19 which provides the control word stored at that address to control latches 18. Control latches 18 provides control signals on line 78 for implementing all cycles except the D cycle for that FLOW. The output of A store 19 is provided to parity checker 17 to determine if a parity error has occurred in the control word that has been read out of the A store 19. Parity checker 17 provides an error signal on line 67 whenever a parity error is detected in the control word read out of A store 19. The error signal on line 67 will set interlock latch 33 and error latch 32. Both interlock latch 33 and error latch 32, once set by an error signal, will remain set by means of lines 69 and 76 respectively.

Error latch 32 generates an error signal on line 77 which is transmitted to the system clocks and to the service processor 10 such that the service processor may institute the recovery process. When set, interlock latch 33 generates an error signal on line 75 which is connected as an input to both A interlock OR 36 and D interlock OR 35. Interlock OR 36, in response to an error signal on line 75, generates an A interlock signal on line 80 which deconditions AND 38 thereby preventing an A release signal from being generated so as to halt the processing of the A cycle until the A interlock signal is removed. Interlock OR 35, in response to an error signal on line 75, generates a D interlock signal on line 81 which deconditions AND 37 thereby preventing a D release signal from being generated so as to halt the processing of the D cycle until the D interlock signal is removed.

The control word stored in the A store 19 for each FLOW is stored at the same address in the A back-up store 21. The system, when receiving an error signal on line 77, will transfer the contents of A back-up store 21 to the A store 19 thereby correcting any error in any control word stored in A store 19. After A cycle 19 has been corrected, the system will then access A back-up store 21 at the address stored in the A address history latches 41 and transfer on line 79 the control word at that address into the control latches 18 thereby setting the control latches 18 to their correct value which the control latches 18 should have been set to had the control word been correctly read out of the A store 19.

AND 37 is conditioned by the coincidence of a D valid signal on line 82, which indicates that the D cycle is valid, and a D interlock signal not being present on line 81. When AND 37 is conditioned, a D release signal will be generated on line 84. AND 38 is conditioned by the coincidence of an A valid signal on line 83, which indicates that the A cycle is valid and an A interlock signal not being present on line 80. When AND 38 is so conditioned an A release signal will be generated on line 85.

Figure 2:
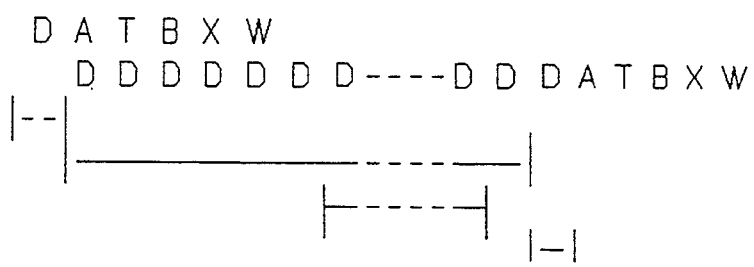
FIG. 2 is a timing chart showing the relationships of various FLOWs of an instruction when an error is detected during the D cycle of an instruction FLOW.

The operation of the error recovery system of FIG. 1 for a D store error is illustrated in FIG. 2. FIG. 2 illustrates the overlap nature of the FLOWs within the system architecture. As can be seen, the D cycle of FLOW 2 begins at the same time as the A cycle of FLOW 1. During the D cycle of FLOW 1 the control word for that D cycle will be processed and the address for the next D cycle for the next FLOW is read into D address latches 11. Therefore D address latches 11 are set prior to the time that the D cycle for FLOW 2 actually begins, as shown in FIG. 2 by the line entitled DCS ACC FLOW 2. During this period of pre D cycle time, D store 12 receives the address from the D address latches 11 and provides the control word on line 64 to control latches 13 and to parity checker 14 which determines if there is a parity error and if so, provides an error signal on line 66. When the D cycle is completed in FLOW 1 a D release signal will be generated on line 84 which will cause the control word on line 64 to be read into control latches 13 and the error signal, if such an error signal exists, to be read into error latches 30 and interlock latch 31. The D release signal will also read the address stored in D address latches 11 into the A cycle latches 22 and the D address history latches 40.

When parity checker 14 detects a parity error in the control word, error latch 30 and interlock latch 31 will be set. The setting of interlock latch 31 will immediately condition D interlock OR 31 to generate a D interlock signal on line 81. The D cycle of FLOW 2 will not be processed because the D release signal is inhibited. The setting of error latch 30 is sensed by the service processor 10 which will effectively turn off all the system clocks and then initiate the recovery procedure. The recovery procedure is shown as the RECOVERY ACTION line in FIG. 2 which shows the recovery starting after FLOW 1 has been completed because the inherent delay in turning off the clocks will in most cases allow these previous FLOWs to be completed before the recovery is initiated. The recovery process is not started until the clocks have been stopped. It should be noted that FLOW 2 remains in the D cycle even though FLOW 1 has executed the A, T, B, X and W cycles for FLOW 1. The recovery procedure will then refresh D store 12 by copying the contents of D back-up store 20 into D store 12. When D store 12 has been refreshed the system will then read the control word from the address stored in the D address history latches 40 and stores the control word into control latches 13, thereby storing the correct values for the control word in control latches 13. At this point in time the system is ready to resume processing and, therefore, the service processor invokes a procedure which generates a reset signal on line 61 which will reset error latch 30 and interlock latch 31. With these latches reset, a D release signal will be generated and the system clocks are started thereby allowing processing of the FLOWs to continue. The restarting of the system clocks allows the normal processing of the control word contained in the control latches 13 to proceed.

Figure 3:
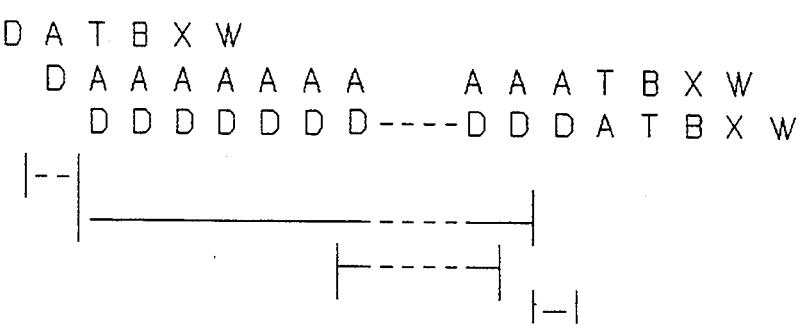
FIG. 3 is a timing chart showing the relationships of the various FLOWs of an instruction when an error is detected during the A cycle of an instruction FLOW.

An example of a parity error occurring during the reading of a control word from the A store 19 is shown in FIG. 3. An error occurring during the reading of a control word from the A store 19 is somewhat more complex in that three FLOWs are involved. It should be noted that because the FLOWs are overlapped the D cycle of FLOW 3 is being processed at the same time as the A cycle of FLOW 2 and the T cycle of FLOW 1. As previously described, the address stored in the D address latches 11 is read into the A address latches 22 upon the occurrence of a D release signal on line 84. As previously described, the D release signal affecting this transfer is the D release signal from the D cycle of FLOW 1. During the A cycle of FLOW 1 the control word at the address in A address latches 22 is read from the A store 19 and presented on line 65 to control latches 18 and parity checker 17. At this time parity checker 17, if detecting a parity error in the control word, will generate an error signal on line 67. Upon the completion for the A cycle of FLOW 1 an A release signal will be generated on line 85 which will read in the control word on line 65 into control latches 18 and any error signal on line 17 into interlock latches 33 and error latch 32. Interlock latch 33 being set will generate an error signal on line 75 which will condition D interlock OR 35 and A interlock OR 36. In response to the error signal on line 75, D interlock OR 35 will generate an interlock signal on line 81 which will decondition AND 37 preventing the issuing of a D release signal on line 84 so as to halt the processing of the D cycle of FLOW 3. In response to the error signal on line 75, A interlock OR 36 will generate an interlock signal on line 80 which will decondition AND 38 preventing an A release signal from being generated on line 85 so as to halt the processing of the A cycle in FLOW 2.

Error latch 32 will generate an error signal on line 77 which is sent to the clock logic and to service processor 10. As previously described, FLOW 1 will generally complete its T, B, X and W cycles before the system clocks are shut off in response to the error signal on line 77. As can be seen, FLOW 2 remains in the A cycle and FLOW 3 remains in the D cycle until the recovery procedure has been completed.

Once the system clocks have been turned off the service processor 10 will read the contents of A back-up store 21 into A store 19 thereby correcting any erroneous control words stored in A store 19 to be corrected.

After the correction has been made to A store 19, the control word, whose address is stored in the A address history latches 41, is read from A back-up store 21 via line 79 into control latches 18 to set control latches 18 to the value that they should have been set to had an error not occurred during the read-out of the control word from A store 19. Upon completion of the recovery procedure, service processor 10 resets interlock latches 31 and error latch 32 by a reset signal on line 61. When interlock latch 33 is reset, the interlock signal on line 75 is removed thereby deconditioning D interlock OR 35 and A interlock OR 36 which in turn conditions AND circuits 37 and 38. The system clocks are then re-initiated and the system proceeds with processing the A cycle of FLOW 2 and the D cycle of FLOW 3.

The invention has used a back-up store not only for the refreshing of the control store in which an error is sensed but also for the setting of the latches which received the erroneous data to their proper value as if an error had not occurred during the initial read-out of a control word from the control store. The invention allows, in most cases, all previous FLOWs to the FLOW encountering the error to be completed before the pipeline is paused for the recovery procedure while interrupting the processing of the error FLOW and any subsequent FLOW from being further processed until the error recovery procedure has been completed, thereby maintaining the proper sequence of FLOWs in the pipeline.

While the invention has been particularly shown and described with reference to the preferred embodiments thereof, it will be understood by those skilled in the art that changes in form and detail may be made therein without departing from the spirit and scope of the invention. Given the disclosure of general concepts and specific embodiments, the scope of protection sought is defined by the following claims.

What is claimed is:

1. An error recovery system used in a pipeline architecture type computer system having an instruction set where each instruction is processed by processing an instruction control word in each cycle of each FLOW associated with the instruction where cycles of different FLOWs are processed at the same time, said error recovery system comprising:

first storage means for storing, for a given cycle of said FLOW, all said control words for all said instructions;

second storage means for storing a control word read from said first storage means;

error recovery means for detecting an error in said control word read from said first storage means and stored in said second storage means and for correcting said error in said control word in said first and second storage means, said error recovery means comprises:

error detector means for generating an error signal when said error detector means detected an error in a control word read from said first storage means;

third storage means for storing all the same said control words that are stored in said first storage means; and error correcting means in response to said error signal generated by said error detector means for reading from said third storage means said control word that was detected as containing said error when read from said first storage means and for storing said read control word in said second storage means, thereby correcting a control word erroneously stored in said second storage means by said first storage means and for storing all said control words in said third storage means into said first storage means thereby correcting errors in said control word stored in said first storage means including said control word that was detected as being in error by said error detector means; and interlock means for halting the processing of the cycle in the FLOW which would have processed said erroneous control word stored in said second storage means and halting the processing of any cycle in any subsequent FLOW to said FLOW in which said error was detected that would have been processed at the same time as the cycle in said FLOW that said error was detected which would have processed the erroneous control word stored in said second storage means.

2. The error recovery system of claim 1 wherein said interlock means initiates the processing of any cycle in any FLOW that was halted by said interlock means after said error was corrected in said first and second storage means by said error recovery means, thereby maintaining the proper sequence of FLOWs within the pipeline of said computer system.

3. An error recovery method for recovering from errors in instruction control words used in a pipeline architecture type computer system having an instruction set where each instruction is processed by processing an instruction control word in each cycle of each FLOW associated with the instruction and where FLOWs overlap such that cycles of different FLOWs are processed at the same time, said error recovery method comprising the steps of:

storing said control words for all said instructions for each cycle of a FLOW in both a separate first storage means and a separate third storage means such that the third storage means maintains the same data as the first storage means;

reading from said first storage means the control word for the instruction to be processed during a next cycle of a FLOW to be processed;

detecting an error in said control word read from said first storage means;

generating an error signal when an error is detected in said control word read from said first storage means;

storing said control word read from said first storage means in the second storage means associated with said first storage means;

halting in response to said error signal the processing of the cycle which would have processed an erroneous control word;

halting in response to said error signal the processing of any cycle that would be processed at the same time as the cycle that would have processed the erroneous control word for any FLOW initiated after the FLOW containing the cycle associated with processing said erroneous control word;

transferring from said third storage means containing the same data as said first storage means from which said erroneous control word was read all data stored in said third storage means into said first storage means to refresh the data in said first storage means and to correct the erroneous control word in said first storage means;

reading for said third storage means said control word that was read erroneous from said first storage means;

storing in said associated second storage means that contains said erroneous control word said control word read from said third storage means thereby correcting the erroneous control word in said second storage means; and initiating the processing of all said halted cycles in all FLOWs.

* * * * *